United States Patent
McLeod et al.

(10) Patent No.: US 11,535,733 B2
(45) Date of Patent: *Dec. 27, 2022

(54) CLARIFIED POLYPROPYLENE FOR LONG TERM COLOR PERFORMANCE

(71) Applicant: FINA TECHNOLOGY, INC., Houston, TX (US)

(72) Inventors: Michael McLeod, Houston, TX (US); John Ashbaugh, Houston, TX (US); Marc Mayhall, Pearland, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,750

(22) Filed: Feb. 27, 2020

(65) Prior Publication Data
US 2020/0277480 A1    Sep. 3, 2020

Related U.S. Application Data

(60) Provisional application No. 62/812,000, filed on Feb. 28, 2019.

(51) Int. Cl.
*C08L 23/12*    (2006.01)
*C08K 5/20*    (2006.01)

(52) U.S. Cl.
CPC .............. *C08L 23/12* (2013.01); *C08K 5/20* (2013.01); *C08L 2201/10* (2013.01)

(58) Field of Classification Search
CPC ........ C08L 23/12; C08L 2201/10; C08K 5/20
See application file for complete search history.

(56) References Cited

U.S. PATENT DOCUMENTS

| | | | |
|---|---|---|---|
| 2005/0163949 A1* | 7/2005 | Vandeurzen | C08F 8/50 428/35.7 |
| 2011/0136950 A1* | 6/2011 | Yu | C08K 5/0041 524/88 |
| 2012/0100383 A1* | 4/2012 | Song | C08J 7/048 428/461 |
| 2013/0165563 A1* | 6/2013 | Lopez | C08L 23/10 524/128 |
| 2016/0311944 A1* | 10/2016 | Quental | C08F 8/50 |
| 2017/0107367 A1* | 4/2017 | Rollin | C08K 5/32 |

OTHER PUBLICATIONS

Maier, Ralph Contribution of Different Additives to the Yellowness Index of Clarified Polypropylene. Annual Technical Conference—Society of Plastics Engineers, 2009, p. 1874-1878. (Year: 2009).*
Maier et al. Processibility and End-Use Properties of Polypropylene Clarified by a High Efficiency Clarifier. Annual Technical Conference—Society of Plastics Engineers (2007), 65th, p. 2680-2684. (Year: 2007).*
Kristiansen et al. "Designer" Nucleating Agents for Polypropylene. Macromolecules 2005, 38, 3688-3695. (Year: 2005).*
Schmidt et al. Crystal Structure of a Highly Efficient Clarifying Agent for Isotactic Polypropylene. Crystal Growth and Design 2012, 12, 2543-2551. (Year: 2012).*
Gahleitner et al., "Nucleation of Polypropylene Homo- and Copolymers"; International Polymer Processing, Mar. 2011, vol. 26, pp. 2-20.
Abraham et al., "Synthesis and Structure-Efficiency Relations of 1,3,5-Benzenetrisamides as Nucleating Agents and Clarifiers for Isotactic Poly(propylene)a"; Macromolecular Chemistry and Physics, Jan. 2010, vol. 211, pp. 171-181.

* cited by examiner

*Primary Examiner* — John E Uselding
(74) *Attorney, Agent, or Firm* — Albert Shung

(57) ABSTRACT

Color-stable rheology controlled polyolefin compositions and methods of making are described. A color-stable rheology controlled polyolefin composition can include a controlled rheology grade thermoplastic polyolefin, and an effective amount of a trisamide-based compound that imparts color-stability to the composition. The color-stable solid-state thermoplastic polyolefin composition can have a Hunter b value color change ($\Delta$b) rate of $\leq$0.03/day when stored at 93° C. for 50 days.

16 Claims, No Drawings

CLARIFIED POLYPROPYLENE FOR LONG TERM COLOR PERFORMANCE

CROSS REFERENCE TO RELATED APPLICATIONS

This application claims the benefit of U.S. Provisional Application No. 62/812,000, filed Feb. 28, 2019, which is incorporated herein by reference in its entirety for all purposes.

BACKGROUND OF THE INVENTION

A. Field of the Invention

The invention generally concerns color-stable rheology controlled polyolefin compositions and methods of making said compositions. In particular, the invention concerns a color-stable rheology controlled polyolefin composition that includes a controlled rheology grade thermoplastic polyolefin, and an effective amount of a trisamide-based compound that imparts long lasting color-stability to the composition.

B. Description of Related Art

Synthetic polymeric materials, particularly plastic resins, are widely used in the manufacturing of a variety of end-use articles ranging from medical devices to food containers. An issue of commercial importance in terms of marketing is the final appearance of the end-use article such as transparent properties. To produce articles with high clarity and transparency, additives such as clarifiers can be added to polyolefin mixtures to promote nucleation and clarity. Gahleitner et al. (*International Polymer Processing*, March, 2011, Vol. 26, pp. 2-20) provides a review of nucleating agents and clarifiers commonly used in the polymer industry. Clarifiers are a subclass of polypropylene nucleators which provide both nucleation and improved clarity. The improved clarity is attributed to the very fine crystal size formed with clarifiers. The size of the crystals is small enough as to permit improved light transmission. By way of example, sorbitol derivatives can be used as nucleating agents and clarifiers. However, sorbitol suffers from thermal degradation when taken to high processing temperatures. High temperatures can cause the sorbitol-based clarifiers to degrade, making them ineffective. In some cases, the sorbitol-based clarifiers degrade and produce unpleasant odors and/or deposit on the walls of the equipment during processing. Furthermore, dispersion of sorbitol-clarifiers in the polymer solution can cause visible imperfections, which are visible in the final product as white specks.

Another example of clarifiers includes trisamide-based compounds. Trisamide-based compounds can be thermally and chemically more stable than sorbitol-based compounds, however, they have their shortcomings. A critical shortcoming is that trisamides-based compounds tend to be significantly less effective in thicker parts, especially at thicknesses greater than about 40 mils. Many molders can produce parts with a variety of thicknesses. Having a product that only functions in a fraction of their total product line is inefficient and often an insurmountable barrier for considering such a product.

In addition to improved clarity, clarified grades of polymers often have demanding color requirements. Yellowness can be undesirable in many applications. In addition, long-term color performance can be important. If a product yellows rapidly as it ages, that can be perceived as an inferior product. Yellowing can be a commercial problem because it creates color differences in customer inventory. For example, molded bins can show a variety of hues based on how a product ages. Customers tend to select the least yellow articles, causing problems in managing and selling older inventory. One means of managing color is to add dyes or optical brighteners. Such products are often an imperfect solution. Optical brighteners can function differently under different light sources and their ability to function is affected by how well the light penetrates a molded article. So in stacked products, such as molded containers, they provide a blue hue, but a hue that is inconsistent and varies thru the stack. Dyes likewise can have antagonistic interactions with other additives, creating problems in color matching and generate purging problems in transitions between colors and/or products.

While various approaches have been tried to improve optical properties in plastic products, there is a need for products having long term color and other optical properties. Abraham et al. (*Macromolecular Chemistry and Physics*, January, 2010, Vol. 211, pp. 171-181) describes the effect of trisamide-based compounds on the optical properties (i.e., clarity and haze) of general purpose polypropylene. However, Abraham is silent as to the use of trisamide-based compounds in vis-broken polyolefin products, which are particularly susceptible to color change on aging. Vis-broken polyolefins have lower molecular weights, narrower molecular weight distributions, and higher melt flow rates, which improve processing characteristics. However, vis-broken polyolefins display significant color change on aging due to the presence of free-radical initiators used during the vis-breaking process. Other additive added to polyolefins during the vis-breaking process to ensure that the physical properties of the polyolefin are maintained can also attribute to color change. For example, the use of phenolic compounds can cause a greater initial color of the product and/or discoloration through interactions with amine compounds, for example, hindered amine light stabilizers. Furthermore, Abraham et al. used methods to prepare polyolefin compositions, which do not mirror what is typical in commercial practice. Abraham et al. started with polypropylene pellets. The pellets were cryogenically pulverized, then mixed with trisamide-based compounds, antioxidants, and lubricant for 24 hours. Finally, the mixture was melted in a lab extruder for 4 minutes. Compositions with different concentrations of trisamide-compound were prepared by successive extrusion with neat polypropylene. Finally, the method used to quench and pelletize the polymer after extrusion was not specified. In contrast, standard commercial practice uses thermoplastic polyolefin powder collected from industrial-scale reactors. Blending of additives may be accomplished during the extrusion process. Due to Abraham et al.'s deviation in procedure from commercial practice, the conditions may have been too harsh, resulting in a loss of antioxidant stabilizer that could have significantly reduced the polyolefin molecular weight and negatively affected the color stability of the compositions.

SUMMARY OF THE INVENTION

A discovery has been found that addresses some of the problems associated with optical properties, notably color, of polyolefin products. The solution resides in addition of an effective amount of a trisamide-based compound to a controlled rheology grade thermoplastic polyolefin to produce a color stable solid-state thermoplastic polyolefin composition. The trisamide-based compound imparts color stability to the composition. The trisamide-based compound can produce a low initial color and can exhibit a slow change in color over time. In particular, the color stable solid-state thermoplastic polyolefin composition has a Hunter b value color change (Δb) rate of ≤0.03/day when stored at 93° C. for 50 days. Thereby, providing a high quality consistent product for resin producers, resin processors and customers alike. As illustrated in a non-limiting manner in the Examples, the invention demonstrates the effectiveness of trisamide-based compounds in stabilizing the color of polyolefin products on aging. Notably, the invention is effective for vis-broken polypropylene products. It was surprisingly found as exemplified in the Examples that the vis-broken polyolefin products retained their color in the absence of phenolic-based antioxidants. Furthermore, the invention is effective at stabilizing the color of vis-broken polyolefins on aging even in the presence of hindered-amine light stabilizers.

In one aspect of the present invention, a color-stable solid-state thermoplastic polyolefin composition is described. The color-stable solid-state thermoplastic polyolefin composition can include (a) a controlled rheology grade thermoplastic polyolefin and (b) an effective amount of a trisamide-based compound that imparts color-stability to the composition. Such a color-stable solid-state thermoplastic polyolefin composition can have a Hunter b value color change (Δb) rate of ≤0.03/day, or a Δb rate of ≤0.02/day, or ≤0.015/day, or a Δb rate of ≤0.035/day, or ≤0.03/day, or ≤0.025/day, when stored at 93° C. for 50 days. When stored at 93° C. for 100 days, the Δb rate can be ≤0.02/day, or ≤0.015/day, or ≤0.01/day. In a preferred embodiment, the controlled rheology grade thermoplastic polyolefin is polypropylene. In some embodiments, the composition is free of a phenolic-based antioxidant. Such a composition can have a Δb rate of ≤0.02/day, or ≤0.01/day, when stored at 93° C. for 50 days. The composition can also be free of a sorbitol-based clarifier and/or phenolic antioxidant. In some embodiments, only a trisamide-based compound is present as a clarifying agent. The composition can be transparent and/or be in the shaped of a plurality of pellets. The trisamide-based compound can be N,N',N''-benzene-1,3,5-triyltris(2,2,-dimethylpropanamide) (CAS No. 745070-61-5), available under the tradename IRGACLEAR® XT386 (BASF Corporation, USA), having structure A. The trisamide-based compound can be 1-N,2-N,3-N-tris(2-methylcyclohexyl)propane-1,2,3-tricarboxamide (CAS No. 160535-46-6), available under the tradename RIKACLEAR® PC1, having structure B.

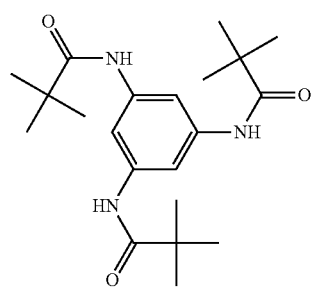

A

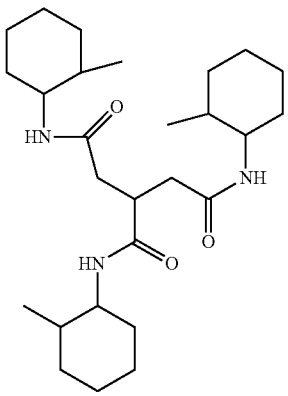

B

The color-stable solid-state thermoplastic polyolefin can have at least 95 wt. %, or at least 98 wt. %, or at least 99 wt. %, of the controlled rheology grade thermoplastic polyolefin, and 0.001 wt. % to 1 wt. %, or 0.005 wt. % to 0.1 wt. %, or 0.01 wt. % to 0.03 wt. %, or 0.01 wt. % to 0.02 wt. % of the trisamide-based compound. In some embodiments, the color-stable solid-state thermoplastic polyolefin composition can include at least 95 wt. %, or at least 98 wt. %, or at least 99 wt. %, of the controlled rheology grade thermoplastic polyolefin, and at least one additive selected from a light stabilizer (e.g., a hindered amine light stabilizer), an anti-static agent (e.g., a glycerol monostearate), a rheological modifier (e.g., an organic peroxide), a lubricant (e.g., a metal stearate), an antioxidant (a phosphite-based antioxidant), or a clarifying agent (e.g., a trisamide-based compound), or any combination, or all thereof. Such a composition can include 0.01 wt. % to 1 wt. %, or 0.01 wt. % to 0.1 wt. %, of the light stabilizer, 0.01 wt. % to 1 wt. %, or 0.01 wt. % to 0.1 wt. %, of the anti-static agent, 0.01 wt. % to 1 wt. %, or 0.01 wt. % to 0.1 wt. %, of the rheological modifier, 0.01 wt. % to 1 wt. %, or 0.01 wt. % to 0.1 wt. %, of the lubricant, and/or 0.01 wt. % to 1 wt. %, or 0.01 wt. % to 0.1 wt. %, of the antioxidant. In some embodiments, the composition includes at least 90 wt. %, or at least 95 wt. %, or at least 99 wt. %, of the controlled rheology grade thermoplastic polyolefin, or a blend of controlled rheology grade thermoplastic polyolefins. The composition can have a melt flow rate (MFR) ranging from 5 to 150 dg/min, or from 10 to 100 dg/min, or from 20 to 80 dg/min. The composition can have a number average molecular weight (Mn) ranging from 15,000 to 75,000 Daltons, or from 17,500 to 65,000 Daltons, or from 20,000 to 55,000 Daltons. The composition can have a weight average molecular weight (Mw) ranging from 100,000 to 300,000 Daltons, or from 125,000 to 255,000 Daltons, or from 135,000 to 235,000 Daltons. The composition can have a polydispersity index (PDI=Mw/Mn) ranging from 3.0 to 9.0, or from 3.5 to 7.0, or from 4.0 to 6.0. In another aspect of the present invention, a method for stabilizing the color of a solid-state thermoplastic polyolefin composition can include adding an effective amount of a trisamide-based compound to a controlled rheology grade thermoplastic polyolefin composition such that the solid-state thermoplastic polyolefin composition has a Hunter b value color change (Δb) rate of ≤0.03/day when stored at 93° C. for 50 days. In a preferred embodiment, the composition is a controlled rheology grade polypropylene composition, and the trisamide-based compound is a trisamide benzene compound, or having the structure A shown above. In another preferred embodiment, the composition is a controlled rheology grade polypropylene composition, and the trisamide-based compound is a trisamide propane compound, or having the structure B shown above.

In yet another aspect of the present invention, a method of making the solid-state thermoplastic polyolefin compositions of the present invention is described. The method can include adding an effective amount of a trisamide-based compound to a controlled rheology grade thermoplastic polyolefin composition such that the solid-state thermoplastic polyolefin composition has a Hunter b value color change (Δb) rate of ≤0.03/day when stored at 93° C. for 50 days. Such a composition can include a controlled rheology grade polypropylene composition, and the trisamide-based compound is the trisamide benzene compound A shown above. Such a composition can alternately include a controlled rheology grade polypropylene composition, and the trisamide-based compound is the trisamide propane compound B shown above.

The following includes definitions of various terms and phrases used throughout this specification.

An "aliphatic" group is an acyclic or cyclic, saturated or unsaturated carbon group, excluding aromatic compounds. A linear aliphatic group does not include tertiary or quaternary carbons. Non-limiting examples of aliphatic group substituents include halogen, hydroxyl, alkyloxy, haloalkyl, haloalkoxy, carboxylic acid, ester, amine, amide, nitrile, acyl, thiol, and thioether. A branched aliphatic group includes at least one tertiary and/or quaternary carbon. Non-limiting examples of branched aliphatic group substituents include alkyl, halogen, hydroxyl, alkyloxy, haloalkyl, haloalkoxy, carboxylic acid, ester, amine, amide, nitrile, acyl, thiol and thioether. A cyclic aliphatic group is includes at least one ring in its structure. Polycyclic aliphatic groups may include fused, e.g., decalin, and/or spiro, e.g., spiro [5.5]undecane, polycyclic groups. Non-limiting examples of cyclic aliphatic group substituents include alkyl, halogen, hydroxyl, alkyloxy, haloalkyl, haloalkoxy, carboxylic acid, ester, amine, amide, nitrile, acyl, thiol and thioether.

An "alkyl" group is linear or branched, substituted or substituted, saturated hydrocarbon. Non-limiting examples of alkyl group substituents include alkyl, halogen, hydroxyl, alkyloxy, haloalkyl, haloalkoxy, carboxylic acid, ester, amine, amide, nitrile, acyl, thiol and thioether.

An "aryl" group or an "aromatic" group is a substituted or substituted, mono- or polycyclic hydrocarbon with alternating single and double bonds within each ring structure. Non-limiting examples of aryl group substituents include alkyl, halogen, hydroxyl, alkyloxy, haloalkyl, haloalkoxy, carboxylic acid, ester, amine, amide, nitrile, acyl, thiol and thioether.

A "heteroaryl" group or a "heteroaromatic" group is a mono- or polycyclic hydrocarbon with alternating single and double bonds within each ring structure, and at least one atom within at least one ring is not carbon. Non-limiting examples of heteroaryl group substituents include alkyl, halogen, hydroxyl, alkyloxy, haloalkyl, haloalkoxy, carboxylic acid, ester, amine, amide, nitrile, acyl, thiol and thioether.

Melt flow rate (MFR) can be measured using ASTM D1238 Test Method. Mn, Mw and DPI can be determined thru gel permeation chromatograph (GPC) using a Polymer Char GCPCIR instrument (Polymer Char, SPAIN). Samples are dissolved in a trichlorobenzene solution and injected into the machine at 140° C. Passing through packed columns, polymer chains of different sizes separate and elute at different times.

The terms "about" or "approximately" are defined as being close to as understood by one of ordinary skill in the art. In one non-limiting embodiment, the terms are defined to be within 10%, or within 5%, or within 1%, or within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods of the present invention can "comprise," "consist essentially of," or "consist of" particular ingredients, components, compositions, etc. disclosed throughout the specification. With respect to the transitional phrase "consisting essentially of," in one non-limiting aspect, basic and novel characteristics of the color-stable solid-state thermoplastic polyolefin compositions of the present invention are their the abilities to have a Hunter b value color change (Δb) rate of ≤0.03/day when stored at 93° C. for 50 days.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DETAILED DESCRIPTION OF THE INVENTION

A discovery has been made that provides a solution to problems associated with stability of the optical properties of the thermoplastic polyolefin compositions, notably, clarity, color, and haze. The discovery is premised on the inclusion of an effective amount of a trisamide-based clarifier in a rheology controlled thermoplastic polyolefin such that the color-stable solid state thermoplastic polyolefin has a Hunter b value color change (Δb) rate of ≤0.03/day when stored at 93° C. for 50 days. As illustrated in a non-limiting manner in the Examples section, this effective amount of a trisamide-based clarifier can be used to make transparent and/or clear products in the absence of sorbitol-based clarifiers and/or phenolic-based antioxidants. Without wishing to be bound by theory, the color stability of this composition can exist throughout varying levels of thickness. This can result in articles of manufacture that have the ability to maintain a consistent optical quality irrespective of their sizes and shapes and irrespective of whether the articles of manufacture have varying degrees of thickness.

These and other non-limiting aspects of the present invention are discussed in further detail in the following sections.

A. Thermoplastic Polyolefin and Clarifying Agent

The term "thermoplastic polyolefin" refers to a plastic that is prepared from at least one olefinic monomer (e.g., ethylene, propylene, butene, hexene, octene, or blends thereof) that may be extruded or molded after being melted. Preferred thermoplastic polyolefins of the present invention can include polyethylene and polypropylene and blends thereof. Polypropylenes include homopolymers of propylene, copolymers of propylene and other olefins, and terpolymers of propylene, ethylene, and dienes. Polyethylenes can include homopolymers of ethylene or copolymers of ethylene with at least one alpha olefin (e.g., butene, hexene, octene and the like). Polyolefins can be prepared by any of the polymerization processes, which are in commercial use (e.g., a "high pressure" process, a slurry process, a solution process and/or a gas phase process) and with the use of any of the known catalysts (e.g., Ziegler Natta catalysts, chromium or Phillips catalysts, single site catalysts, metallocene catalysts and the like). The compositions of the present invention can include at least, equal to, or between any two of 90, 91, 92, 93, 94, 95, 96, 97, 98, and 99 wt. % of a thermoplastic polyolefin or a blend of thermoplastic polyolefins with respect to the total weight of the composition. A controlled rheology grade thermoplastic polyolefin is a thermoplastic polyolefin that has been further processed (e.g., through a degradation process) to produce a polyolefin product with a targeted final melt flow rate (MFR) higher than, a molecular weight lower than, and/or a molecular weight distribution narrower than that of the starting thermoplastic polyolefin.

The clarifying agent can be a trisamide-based compound. Trisamides can include amide derivatives of benzene and have the general structure of:

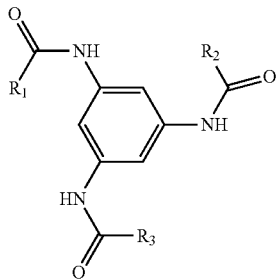

where $R_1$, $R_2$, and $R_3$ can independently be a hydrogen atom, an alkyl group, a substituted alkyl group, a heteroalkyl group, a substituted heteroalkyl group, a cycloalkyl group, a substituted cycloalkyl group, a heterocycloalkyl group, a substituted heterocycloalkyl group, an aryl group, a substituted aryl group, a benzyl group, a substituted benzyl group, a heteroaryl group, a substituted heteroaryl group, an alkoxy group, and alkoxyalkyl group, an alkoxycarbonyl group, and an amino group. In some embodiments, $R_1$, $R_2$, and $R_3$ can be an tert-butyl group, an isopropyl group, a cyclohexyl group, a n-butyl group, 3-methylbutyl group, a 1,2-dimethylpropyl group. Trisamide benzene-based compounds can have the following structures shown below.

In certain aspects, at least one of $R_1$, $R_2$, and $R_3$ is a tert-butyl group. In a preferred aspect, each of $R_1$, $R_2$, and $R_3$ is a tert-butyl group. By way of example, the trisamide benzene clarifier is N,N',N''-benzene-1,3,5-triyltris(2,2-dimethylpropanamide) (CAS No. 745070-61-5). A composition of the invention can include 0.01 wt. %, 02 wt. %, 0.3 wt. %, 0.4 wt. %, 0.5 wt. %, 0.6 wt. %, 0.7 wt. %, 0.8 wt. %, 0.9 wt. %, and 0.1 wt. % of total clarifier based on the total with of the composition. Trisamides can include amide derivatives of propane and have the general structure of:

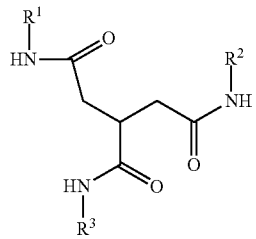

where $R^1$, $R^2$, and $R^3$ can each independently be an alkyl group, a cyclic alkyl group or a substituted cyclic alkyl group. In some embodiments, $R^1$, $R^2$, and $R^3$ can be a substituted cyclohexyl group, or in one embodiment, a methyl substituted cyclohexyl group. A non-limiting example of a trisamide propane clarifier is 1-N,2-N,3-N-tris(2-methylcyclohexyl)propane-1,2,3-tricarboxamide (CAS No. 160535-46-6).

C. Additives

The color-stable solid state thermoplastic polyolefin compositions of the present invention can further include at least one additive. Non-limiting examples of additives include a light stabilizer, an anti-static agent, a rheological modifier, a lubricant, an antioxidant, or any combination thereof. Additives are available from various commercial suppliers. Non-limiting examples of commercial additive suppliers include BASF (Germany), Dover Chemical Corporation (U.S.A.), AkzoNobel (The Netherlands), Sigma-Aldrich® (U.S.A.), Atofina Chemicals, Inc., and the like.

1. Light Stabilizers

In certain aspects, at least, equal to, or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % of the composition is a light stabilizer. The light stabilizer can be a hindered amine light stabilizer. The term "hindered amine light stabilizer" refers to a class of amine compounds having certain light stabilizing properties. Non-limiting examples, of hindered amine light stabilizers (HALS) include 1-cyclohexyloxy-2,2,6,6-tetramethyl-4-octadecylaminopiperidine; bis(2,2,6,6-tetramethylpiperidin-4-yl) sebacate; bis(1-acetoxy-2,2,6,6-tetramethylpiperidin-4-yl) sebacate; bis(1,2,2,6,6-pentamethylpiperidin-4-yl) sebacate; bis(1-cyclohexyloxy-2,2,6,6-tetramethylpiperidin-4-yl) sebacate; bis(1-octyloxy-2,2,6,6-tetramethylpiperidin-4-yl)

sebacate; bis(1-acyl-2,2,6,6-tetramethylpiperidin-4-yl) sebacate; bis(1,2,2,6,6-pentamethyl-4-piperidyl) n-butyl-3,5-di-tert-butyl-4-hydroxybenzyl malonate; 2,4-bis[(1-cyclohexyloxy-2,2,6,6-tetramethylpiperidin-4-yl)butylamino]-6-(2-hydroxyethylamino-s-triazine; bis(1-cyclohexyloxy-2,2,6,6-tetramethylpiperidin-4-yl) adipate; 2,4-bis[(1-cyclohexyloxy-2,2,6,6-piperidin-4-yl)butylamino]-6-chloro-s-triazine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; 1-(2-hydroxy-2-methyl propoxy)-4-octadecanoyloxy-2,2,6,6-tetramethyl piperidine; bis(1-(2-hydroxy-2-methylpropoxy)-2,2,6,6-tetramethylpiperi din-4-yl) sebacate;bis(1-(2-hydroxy-2-methylpropoxy)-2,2,6,6-tetramethylpiperidin-4-yl) adipate; 2,4-bis{N-[1-(2-hydroxy-2-methyl propoxy)-2,2,6,6-tetramethylpiperidin-4-yl]-N-butylamino}-6-(2-hydroxyethylamino)-s-triazine; 4-benzoyl-2,2,6,6-tetramethylpiperidine; di-(1,2,2,6,6-pentamethylpiperidin-4-yl) p-methoxybenzylidenemalonate; 2,2,6,6-tetramethylpiperidin-4-yl octadecanoate; bis(1-octyloxy-2,2,6,6-tetramethylpiperidyl) succinate; 1,2,2,6,6-pentamethyl-4-aminopiperidine; 2-undecyl-7,7,9,9-tetramethyl-1-oxa-3,8-diaza-4-oxo-spiro[4,5]decane; tris(2,2,6,6-tetramethyl-4-piperidyl) nitrilotriacetate; tris(2-hydroxy-3-(amino-(2,2,6,6-tetramethylpiperidin-4-yl)propyl) nitrilotriacetate; tetrakis(2,2,6,6-tetramethyl-4-piperidyl)-1,2,3,4-butane-tetracarboxylate; tetrakis(1,2,2,6,6-pentamethyl-4-piperidyl)-1,2,3,4-butane-tetracarboxylate; 1,1'-(1,2-ethanediyl)-bis(3,3,5,5-tetramethylpiperazinone); 3-n-octyl-7,7,9,9-tetramethyl-1,3,8-triazaspiro[4.5]decan-2,4-dione; 8-acetyl-3-dodecyl-7,7,9,9-tetramethyl-1,3,8-triazaspiro[4.5]decane-2,4-dione; 3-dodecyl-1-(2,2,6,6-tetramethyl-4-piperidyl)pyrrolidin-2,5-dione; 3-dodecyl-1-(1,2,2,6,6-pentamethyl-4-piperidyl)pyrrolidine-2,5-dione; N,N'-bis-formyl-N,N'-bis(2,2,6,6-tetramethyl-4-piperidyl) hexamethylenediamine; reaction product of 2,4-bis[(1-cyclohexyloxy-2,2,6,6-piperidin-4-yl)butylamino]-6-chloro-s-triazine with N,N'-bis(3-aminopropyl)ethylenediamine); condensate of 1-(2-hydroxy ethyl)-2,2,6,6-tetramethyl-4-hydroxypiperidine and succinic acid; condensate of N,N'-bis(2,2,6,6-tetramethyl-4-piperidyl)-hexamethylenediamine and 4-tert-octylamino-2,6-dichloro-1,3,5-triazine; condensate of N,N'-bis(2,2,6,6-tetramethyl-4-piperidyl)-hexamethylenediamine and 4-cyclohexylamino-2,6-dichloro-1,3,5-triazine; condensate of N,N'-bis-(2,2,6,6-tetramethyl-4-piperidyl)hexamethylenediamine and 4-morpholino-2,6-dichloro-1,3,5-triazine; condensate of N,N'-bis-(1,2,2,6,6-pentamethyl-4-piperidyl)hexamethylenediamine and 4-morpholino-2,6-dichloro-1,3,5-triazine; condensate of 2-chloro-4,6-bis(4-n-butylamino-2,2,6,6-tetramethyl piperidyl)-1,3,5-triazine and 1,2-bis(3-aminopropylamino)ethane; condensate of 2-chloro-4,6-di-(4-n-butylamino-1,2,2,6,6-pentamethylpiperidyl)-1,3,5-triazine and 1,2-bis-(3-aminopropylamino)ethane; a reaction product of 7,7,9,9-tetramethyl-2-cycloundecyl-1-oxa-3,8-diaza-4-oxospiro[4,5]decane and epichlorohydrin; poly[methyl, (3-oxy-(2,2,6,6-tetramethylpiperidin-4-yl)propyl)]siloxane, CAS #182635-99-0; reaction product of maleic acid anhydride-C18-C22-α-olefin-copolymer with 2,2,6,6-tetramethyl-4-aminopiperidine; oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; oligomeric condensate of 4,4'-hexamethylenebis (amino-1,2,2,6,6-pentaamethylpiperidine) and 2,4-dichloro-6-[(1,2,2,6,6-pentaamethylpiperidin-4-yl)butylamino]-s-triazine end-capped with 2-chloro-4,6-bis(dibutylamino)-s-triazine; oligomeric condensate of 4,4'-hexamethylenebis(amino-1-propoxy-2,2,6,6-tetramethyl piperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine; oligomeric condensate of 4,4'-hexamethylenebis(amino-1-acyloxy-2,2,6,6-tetramethyl piperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine; and product obtained by reacting (a) with (b) where (a) is product obtained by reacting 1,2-bis(3-aminopropylamino)ethane with cyanuric chloride and (b) is (2,2,6,6-tetramethyl piperidin-4-yl)butylamine. Also included are the sterically hindered N—H, N-methyl, N-methoxy, N-hydroxy, N-propoxy, N-octyloxy, N-cyclohexyloxy, N-acyloxy and N-(2-hydroxy-2-methylpropoxy) analogues of any of the above mentioned compounds. Non-limiting examples of commercial light stabilizer are available from BASF under the trade name UNIVUL® (BASF, Germany) 4050H, 4077H, 4092H, 5062H, 5050H, 4092H, 4077H, 3026, 3027, 3028, 3029, 3033P, and 3034 or TINUVIN® (BASF, Germany) 622 or CHIMASSORB® (BASF, Germany) 199 and 944. UNIVUL® 505H is alkenes, C20-24 α-, polymers with maleic anhydride, reaction products with 2,2,6,6-tetramethyl-4-piperidinamine. TINUVIN® 622 is butanedioic acid, dimethylester, polymer with 4-hydroxy-2,2,6,6-tetramethyl-1-piperidine ethanol. CHIMASSORB® 199 is 1,5,8,12-Tetrakis [4,6-bis(N-butyl-N-1,2,2,6,6-pentamethyl-4-piperidylamino)-1,3,5-triazin-2-yl]-1,5,8,12-tetraazadodecane. CHIMASSORB® 944 is poly[ [6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]).

2. Antistatic Agent.

Anti-static agents can be used to inhibit accumulation of dust on plastic articles. Antistatic agents can improve the electrical conductivity of the plastic compositions, and thus dissipate any surface charges, which develop during production and use. Thus, dust particles are less attracted to the surface of the plastic article, and dust accumulation is consequently reduced. In certain aspects of the present invention, the antistatic agent can be a glycerol monostearate, ethoxylated fatty acid amine, diethanolamide, or ethoxylated sorbitan ester. A composition of the invention can include 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % of total anti-static agent based on the total with of the composition. Anti-static agents are available from various commercial suppliers. A non-limiting example of a commercial ethoxylated fatty acid amine anti-static agent include N,N-bis-(2-hydroxyethyl) coco fatty amine available under the tradename HOSTASTAT® FA 24 (Clariant, Switzerland). HOSTASTAT® FA 38 and HOSTASTAT® FA 68 are other examples. An example of a commercial diethanolamide anti-static agent is N,N-bis(2-hydroxyethyl)dodecanamide, available under the tradename ARMOSTAT® 2000 (Akzo Nobel). A commercial example of an ethoxylated sorbitan ester anti-static agent is octadecanoic acid 2-[2-hydroxyethyl)octadecylamino]ethyl ester, available under the tradename SABOSTAT® A 300 (Sabo S.p.A., Italy).

3. Rheological Modifier

Rheological modifiers are additives that affect the material's flow properties. Rheological modifiers can include organic peroxides. Organic peroxides that can be used in the context of the present invention can include dialkyl and peroxyketal type peroxides. An example of a commercially available dialkyl peroxide is 2,5-dimethyl-2,5-di(t-butylperoxy)hexane, available as LUPERSOL® 101, from Arkema, Inc., (France). Commercially available peroxyketal peroxides include t-butyl type peroxides, including ethyl 3,3-di(t-butylperoxy)butyrate, available under the tradename LUPERSOL® 233, and t-amyl type peroxides, including ethyl 3,3-bis(tert-amylperoxy)butyrate, available under the tradename LUPERSOL® 533 (Arkema, Inc., France.) and bis(1,1-dimethylpropyl) peroxide, available under the tradename LUPEROX® DTA(Arkema, Inc., France). An example of a commercially available cyclic peroxide is 3,6,9-triethyl-3,6,9,-trimethyl-1,4,7-triperoxonane, available as TRIGONOX® 301 (AkzoNobel). The choice of organic peroxide can vary depending upon the particular application and extruder temperatures. A composition of the invention can include at least, equal to, or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % of total rheological modifier based on the total weight of the composition.

4. Lubricant.

A lubricant can be added to a thermoplastic polymer to improve the mold-making characteristics. The lubricant can be a low molecular compound from a group of fatty acids, fatty acid esters, wax ester, fatty alcohol ester, amide waxes, metal carboxylate, montanic acids, montanic acid ester, or such high molecular compounds, as paraffins or polyethylene waxes. In certain aspects of the present invention, the lubricant is a metal stearate. Non-limiting examples of metal stearates include zinc stearate, calcium stearate, lithium stearate, sodium stearate, potassium stearate, magnesium stearate, or a combination thereof. In one embodiment, the metal sterate is calcium stearate. A composition of the invention can include at least, equal to, or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % of total lubricant based on the total weight of the composition.

5. Antioxidants

Antioxidants can provide protection against polymer degradation during processing. Phenolics, phosphites, and lactones are known thermal oxidative stabilizing agents for polymers and other organic materials. The antioxidant can be a phenolic-based antioxidant. A non-limiting example of a commercially available phenolic antioxidant is pentaerythritol tetrakis(3-(3,5-di-tert-butyl-4-hydroxyphenyl)propionate), available under the tradename IRGANOX® 1010 (BASF). The antioxidant can be a phosphite-based antioxidant. In certain aspects phosphite-antioxidants include, but are not limited to, triphenyl phosphite, diphenylalkyl phosphites, phenyldialkyl phosphites, tris(nonylphenyl)phosphite, trilauryl phosphite, trioctadecyl phosphite, diisodecyl pentaerythritol diphosphite, tristearyl sorbitol triphosphite. Non-limiting examples of commercially available phosphite-based antioxidants include bis(2,4-di cumylphenyl) pentaerythritol diphosphite, available under the tradename DOVERPHOS® S9228T (Dover Chemical Company), phosphorous acid, triphenyl ester, polymer with α-hydro-ω-hydroxypoly[oxy(methyl-1,2-ethanediyl)], C10-16 alkyl esters, available under the tradename DOVERPHOS® LGP-11 (Dover Chemical Company, USA), tris(2,4-di-tert-butylphenyl)phosphite, available under the tradename IRGAFOS® 168 (BASF), bis(2,4-di-tert-butylphenyl)pentaerythritol diphosphite, available under the tradename ULTRANOX® 626 (Addivant, USA), tetrakis(2,4-di-tert-butylphenyl)-4,4'-biphenylene diphosphonate, available under the tradename HOSTANOX® P-EPQ (Clariant), and distearyl pentaerythritol diphosphite, available under the tradename WESTON® 619F (Addivant). The antioxidant can be a lactone-based compound. In certain aspects lactone-antioxidants may include, but are not limited to, 5,7-bis(1,1-dimethylethyl)-3-[2,3(or 3,4)-dimethylphenyl]-2(3H)-benzofuranone, available under the tradename IRGANOX® HP-136 (BASF). A composition of the invention can include at least, equal to, or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % of total antioxidant based on the total weight of the composition.

D. Making the Color Stable Thermoplastic Polyolefin Composition

The color stable thermoplastic polyolefin compositions of the present invention can be prepared from thermoplastic polyolefin powder collected from industrial-scale reactors. The temperature of the thermoplastic polyolefin powder may range from 0° C. to 100° C., or 20° C. to 80° C., or at least any one of, equal to any one of, or between any two of 0, 10, 20, 30, 40, 50, 60, 70, 80, 90, 100° C. during addition of clarifying agents and optional additives. The addition of clarifying agents and optional additives to the polyolefin composition can be carried out in a customary mixing machine, in which the rheology grade controlled thermoplastic polyolefin can be melted and mixed with the clarifying agents and optional additives. The clarifying agents and optional additives can alternatively be added at the end of a processing step to produce the rheology grade thermoplastic polyolefin. Suitable machines are known to those skilled in the art. Non-limiting examples include mixers, kneaders and extruders. In certain aspects, the process can be carried out in an extruder by introducing the additives during processing. Non-limiting examples of extruders can include single-screw extruders, contrarotating and co-rotating twin-screw extruders, planetary-gear extruders, ring extruders, or co-kneaders. It is also possible to use processing machines provided with at least one gas removal compartment to which a vacuum can be applied.

Components can be premixed or added individually. By way of example, the trisamide-based clarifying agent and additives of the present invention can be premixed such that the blend is formed prior to adding it to the polyolefin composition. Alternatively, the trisamide-based clarifier can be added separately to the polyolefin composition. If the trisamide-based clarifier is added separately, then clarifier can be added simultaneously to the composition or at different sequences (e.g., the trisamide-based clarifier can be added first followed by the remaining additives, or vice versa). The polyolefin can be subjected to an elevated temperature for a sufficient period of time during incorporation of additives. The temperature is generally above the softening point of the polymers. In certain aspects, a process can be performed at a temperature from about 400° F. (204° C.) to 585° F. (307° C.), or at least, equal to, or between any two of 204° C., 210° C., 250° C., 275° C., 300° C., and 307° C. Such "melt mixing" or "melt compounding" results in uniform dispersion of the present additives in the polyolefin. Incorporation of additives into the polyolefin resin can be carried out, for example, by mixing the above-described components using methods customary in process technology.

The polyolefin compositions are normally collected as pellets, which may be stored for a time or employed immediately in a forming process. The forming processes include injection molding, extrusion blow molding, injection stretch blow molding, thermoforming, compression molding or sheet extrusion. The final formed articles are for instance molded parts, sheets, films or fibers. For example lids, bottles, containers, automotive parts, refrigerator parts, trays, computer parts and the like.

The composition can exhibit a reduced haze. Light transmission, clarity and haze are measured according to ASTM D1003. The present composition can exhibit a haze value of less than 40 according to ASTM D1003. The compositions of the present invention can have a haze % of at less than, equal to, between 40, 35, 30, 25, 20, 15, 10, 5 and 2. The present composition can have a thickness of 0.05, 0.1, 0.5, 1, 2, 3 cm or more. In certain aspects, the thickness can be at least, equal to, or between 0.001, 0.005, 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.5, 2.0, 2.5, and 3.0. cm. In a preferred embodiment, the thickness is greater than or equal to 0.1 cm (40 mils).

The composition can a stable color over a period of time (e.g., 50 days, 100 days, 1 year, 2 years, and the like) Color stability can be measured using a Humber L, a, b color scale developed by Hunter Lab (U.S.A.). The Hunter L, a, b is based on opponent-color theory, which assumes that the receptors in the human eye perceive color as the following pairs of opposites.
- L scale: Light vs. dark where a low number (0-50) indicates dark and a high number (51-100) indicates light.
- a scale: Red vs. green where a positive number indicates red and a negative number indicates green.
- b scale: Yellow vs. blue where a positive number indicates yellow and a negative number indicates blue.

The L value indicates the level of light or dark, the a value redness or greenness, and the h value yellowness or blueness. All three values are required to completely describe an object's color. The delta values ($\Delta L$, $\Delta a$, and $\Delta b$) indicate how much a standard and sample differ from one another in L, a, and b. The $\Delta L$, $\Delta a$, and $\Delta b$ values are often used for quality control or formula adjustment. Tolerances can be set for the delta values. Delta values that are out of tolerance can indicate that there is too much difference between the standard and the sample and adjustments to the processing parameters can be made. Hunter L, a, b instruments are commercially available from Hunter Lab (U.S.A.).

The compositions of the present invention can have a Hunter b value color change ($\Delta b$) rate of ≤0.03/day, ≤0.02/day, or ≤0.01/day, when stored at 93° C. for 50 days. In some embodiments, the composition has a $\Delta b$ rate of ≤0.02/day, or ≤0.015/day, or ≤0.01/day, when stored at 93° C. for 100 days. The color change is based on the original color of the composition as compared to the color of the same composition over time.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Materials

Table 1 lists the source and function of the clarifiers and additives used to prepare the compositions of the present invention and comparative samples.

TABLE 1

| Name | Function | Source |
| --- | --- | --- |
| TINUVIN ® 622 | Light stabilizer | BASF |
| UVINUL ® 5050H | Light stabilizer | BASF |
| IRGANOX ® 1010 | Phenol-based antioxidant | BASF |
| IRGANOX ® 1076 | Phenol-based antioxidant | BASF |
| IRGAFOS ® 168 | Phosphite-bead antioxidant | BASF |
| LUPERSOL ® 101 | Rheology Modifier | Atofina Chemicals |
| TRIGONOX ® 301 | Rheological modifier | BASF |
| Glycerol monostearate | Anti-static agent | Caravan (U.S.A.) |
| Calcium stearate | Lubricant | FACI Group |
| DOVERPHOS ® S9228T | Lubricant | Dover Chemical Co. |
| MILLAD ® 3988 | Sorbitol based clarifier | Milliken Chemical (U.S.A.) |
| MILLAD ® NX 8000 | Sorbitol-based clarifier | Milliken Chemical (U.S.A.) |
| IRGACLEAR ® XT 386 | Trisamide-based clarifier | BASF |
| Polypropylene | | TOTAL (LaPorte, TX) |

Example 1

Preparation of Thermoplastic Polyolefin Compositions

Compositions described in Examples 1-7 were produced by the following method:

The present composition was produced using plant-scale extrusion equipment as part of a continuous process. Thermoplastic polyolefin powder was collected from industrial-scale reactors and transferred to an inline blender while still at an elevated temperature from 50° C. and 80° C. Additives were added to the thermoplastic polyolefin powder and mixed for in line prior to feeding into the extruder. The extrusion temperature ranged from 240° C. and 260° C. to encompass the broad temperature range typically used to process clarified polyolefin compositions industrially. The composition was extruded at 10000 to 15000 kg/hr. The extrudate was pelletized using an underwater pelletizer, sent to a dryer to remove water, and sent to a classifier to remove pellets not conforming to size requirements. Finally, pellets were transferred to storage containers.

Example 2

Color-Stable Rheology Controlled Composition of the Present Invention

Table 2 lists the ingredients of a composition of the present invention.

TABLE 2

| Name | Amount (wt. %) |
| --- | --- |
| UVINUL ® 5050H | 0.025 |
| TRIGONOX ® 301 | 0.045 |
| Glycerol monostearate | 0.055 |
| Calcium stearate | 0.070 |
| DOVERPHOS ® S9228T | 0.04 |
| IRGACLEAR ® XT 386 | 0.02 |
| Polypropylene | 99.8 |

Example 3

Color-Stable Rheology Controlled Composition of the Present Invention

Table 3 lists the ingredients of composition of the present invention.

TABLE 3

| Name | Amount (wt. %) |
| --- | --- |
| TINUVIN ® 622 | 0.05 |
| TRIGONOX ® 301 | 0.045 |
| Glycerol monostearate | 0.055 |
| Calcium stearate | 0.070 |
| DOVERPHOS ® S9228T | 0.04 |
| IRGACLEAR ® XT 386 | 0.02 |
| Polypropylene | 99.76 |

Example 4

Comparative Composition with Phenolic Antioxidant

Table 4 lists a comparative composition that includes a phenolic anti-oxidant.

TABLE 4

| Name | Amount (wt. %) |
| --- | --- |
| IRGANOX ® 1010 | 0.05 |
| TRIGONOX ® 301 | 0.045 |
| Glycerol monostearate | 0.054 |
| Calcium stearate | 0.046 |
| DOVERPHOS ® S9228T | 0.03 |
| IRGACLEAR ® XT 386 | 0.02 |
| Polypropylene | 99.8 |

Example 5

Comparative Composition with Sorbitol-Based Clarifier

Table 5 lists a comparative composition that includes a sorbitol-based clarifying agent.

TABLE 5

| Name | Amount (wt. %) |
| --- | --- |
| Calcium stearate | 0.046 |
| IRGANOX ® 1010 | 0.054 |
| IRGANOX ® 1076 | 0.005 |
| LUPERSOL ® 101 | 0.095 |
| MILLAD ® 3988 | 0.181 |
| Glycerol monostearate | 0.054 |
| IRGAFOS ® 168 | 0.054 |
| Polypropylene | 99.65 |

Example 6

Comparative Composition with Sorbitol-Based Clarifier

Table 6 lists a comparative composition that includes a sorbitol-based clarifying agent and a phenolic antioxidant.

TABLE 6

| Name | Amount (wt. %) |
| --- | --- |
| IRGANOX ® 1010 | 0.054 |
| Glycerol monostearate | 0.054 |
| TRIGONOX ® 301 | 0.045 |
| Calcium stearate | 0.046 |
| DOVERPHOS ® S9228T | 0.030 |
| MILLAD ® NX 8000 | 0.21 |
| Polypropylene | 99.6 |

Example 7

Comparative Composition with Sorbitol-Based Clarifier

Table 7 lists a comparative composition that includes a sorbitol-based clarifying agent.

TABLE 7

| Name | Amount (wt. %) |
| --- | --- |
| TINUVIN ® 622 | 0.05 |
| Glycerol monostearate | 0.055 |
| TRIGONOX ® 301 | 0.072 |
| Calcium stearate | 0.070 |
| DOVERPHOS ® S9228T | 0.040 |
| MILLAD ® NX 8000 | 0.180 |
| Polypropylene | 99.6 |

Example 8

Comparative Composition with Sorbitol-Based Clarifier

Table 8 lists a comparative composition that includes a sorbitol-based clarifying agent.

TABLE 8

| Name | Amount (wt. %) |
| --- | --- |
| TINUVIN ® 622 | 0.05 |
| Glycerol monostearate | 0.055 |
| TRIGONOX ® 301 | 0.045 |
| Calcium stearate | 0.070 |
| DOVERPHOS ® S9228T | 0.040 |
| MILLAD ® NX 8000 | 0.180 |
| Polypropylene | 99.6 |

Example 9

Characterization of Compositions of the Present Invention and Comparative Compositions Pellets made from the compositions of Examples 2-8 were aged in an convection over at 93° C. for the listed time. Hunter color b values for each composition was determined using a Colorflex EZ Spectrophotometer (Hunter Associates Laboratory, Inc., USA). Table 9 lists the Example No., oven time in days, b at time zero, b at time 49 or 48 days and the Hunter b change. Some sample formulations were run multiple times. Table 10 lists the i-laze data for films made from composition of samples 2, 5, and 7. Samples 5 and 7 are comparative samples.

TABLE 9

| Example No. | Oven Time | b- time zero | b-end of oven time | Δb |
|---|---|---|---|---|
| 1 | 48 | −0.23 | 0.49 | 0.72 |
| 2 | 48 | −0.66 | −0.25 | 0.41 |
| 2 | 48 | −0.64 | −0.29 | 0.35 |
| 3 | 49 | 3.36 | 3.36 | 0 |
| 3 | 49 | 2.42 | 2.77 | 0.35 |
| 3 | 49 | 2.37 | 2.93 | 0.56 |
| 3 | 49 | 2.62 | 3.4 | 0.78 |
| 3 | 49 | 2.62 | 3.4 | 0.78 |
| 4 | 49 | −0.5 | 1.04 | 1.54 |
| 5 | 49 | 2.03 | 3.58 | 1.44 |
| 6 | 48 | −7.95 | −5.59 | 2.36 |
| 7 | 48 | −7.34 | −5.54 | 1.80 |

TABLE 10

| Material | | Sample | | |
|---|---|---|---|---|
| mils | cm | 5 | 7 | 2 |
| 20 mils | 0.0508 | 6.1 | 8.34 | 7.11 |
| 40 mils | 0.1016 | 11.6 | 14.9 | 15.7 |
| 60 mils | 0.1524 | 15.3 | 15.9 | 24.4 |
| 80 mils | 0.2032 | 28.2 | 28.4 | 44.1 |

From the data, it was determined that the product compositions (Examples 1 and 2) had less yellowing (lower Δb value) over time. It was also determined that although phenolic antioxidant sample had similar to the same Δb value, the initial color was more yellow (higher b value) than the color-stable rheology controlled compositions of the present invention (i.e., Example 3 versus Examples 1 and 2). Haze of the films of 0.1 cm or less in thickness had comparable haze values as those made with phenolic antioxidants or sorbitol clarifiers.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A color-stable solid-state thermoplastic polyolefin composition comprising:
(a) a vis-broken thermoplastic polyolefin; and
(b) a trisamide-based compound,
(c) a hindered amine light stabilizer;
(d) a glycerol monostearate;
(e) an organic peroxide;
(f) a metal stearate; and
(g) a phosphite-based antioxidant;
wherein the color-stable solid-state thermoplastic polyolefin composition has a Hunter b value color change (Δb) rate of ≤0.03/day when stored at 93° C. for 50 days, wherein the color-stable solid-state thermoplastic polyolefin composition has a melt flow rate (MFR) as measured by ASTM D1238 ranging from 5 dg/min to 150 dg/min.

2. The color-stable solid-state thermoplastic polyolefin composition of claim 1, wherein the vis-broken thermoplastic polyolefin is polypropylene.

3. The color-stable solid-state thermoplastic polyolefin composition of claim 1, wherein the trisamide-based compound is a trisamide benzene compound or a trisamide propane compound.

4. The color-stable solid-state thermoplastic polyolefin composition of claim 3, wherein the trisamide-based compound is a trisamide benzene compound having the following structure A or a trisamide propane compound having the following structure B:

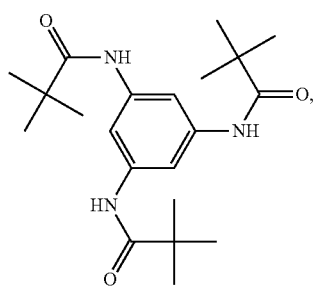

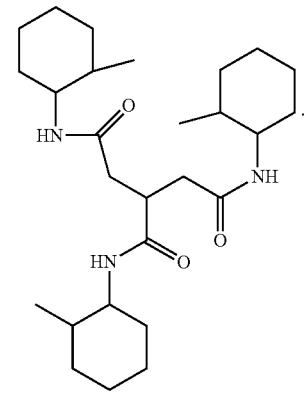

5. The color-stable solid-state thermoplastic polyolefin composition of claim 1, wherein the color-stable solid-state thermoplastic polyolefin composition has Δb rate of ≤0.02/day when stored at 93° C. for 50 days.

6. The color-stable solid-state thermoplastic polyolefin composition of claim 1, wherein the color-stable solid-state thermoplastic polyolefin composition has Δb rate of ≤0.035/day when stored at 93° C. for 100 days.

7. The color-stable solid-state thermoplastic polyolefin composition of claim 1, comprising:
   at least 95 wt. %, of the thermoplastic polyolefin; and
   0.001 wt. % to 1 wt. %, of the trisamide-based compound.

8. The color-stable solid-state thermoplastic polyolefin composition of claim 1, wherein the composition is free of a phenolic-based antioxidant.

9. The color-stable solid-state thermoplastic polyolefin composition of claim 1, wherein the color-stable solid-state thermoplastic polyolefin composition has Δb rate of ≤0.02/day when stored at 93° C. for 50 days.

10. The color-stable solid-state thermoplastic polyolefin composition of claim 8, wherein the color-stable solid-state thermoplastic polyolefin composition has Δb rate of ≤0.02/day when stored at 93° C. for 100 days.

11. The color-stable solid-state thermoplastic polyolefin composition of claim 1, wherein the composition is free of a sorbitol-based clarifier.

12. The color-stable solid-state thermoplastic polyolefin composition of claim 1, wherein the composition is transparent.

13. The color-stable solid-state thermoplastic polyolefin composition of claim 1, comprising at least 90 wt. % of the thermoplastic polyolefin, or a blend of thermoplastic polyolefins.

14. A method of making the color-stable solid-state thermoplastic polyolefin composition of claim 1, the method comprising adding an effective amount of a trisamide-based compound to a controlled rheology grade thermoplastic polyolefin composition such that the solid-state thermoplastic polyolefin composition has a Hunter b value color change (Δb) rate of ≤0.03/day when stored at 93° C. for 50 days.

15. The method of claim 14, wherein the controlled rheology grade thermoplastic polyolefin composition is a controlled rheology grade polypropylene composition, and the trisamide-based compound is a trisamide benzene compound, or having the following structure A, or a trisamide propane compound, or having the following structure B:

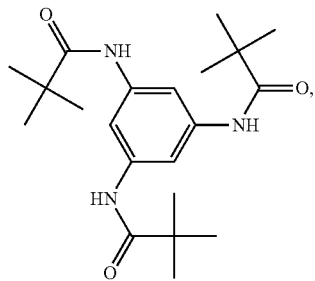

A

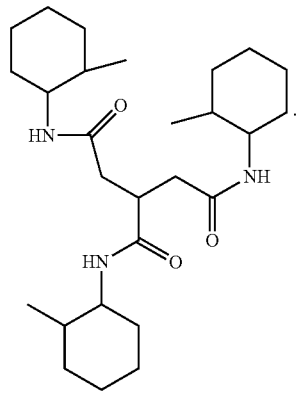

B

16. The color-stable solid-state thermoplastic polyolefin composition of claim 1, wherein the thermoplastic polyolefin has
   a number average molecular weight (Mn) as measured by gel permeation chromatography (GPC) ranging from 15,000 to 75,000 Daltons;
   a weight average molecular weight (Mw) as measured by GPC ranging from 100,000 to 300,000 Daltons; and
   a polydispersity index (PDI=Mw/Mn) ranging from 3.0 to 9.0.

\* \* \* \* \*